United States Patent [19]
Hager et al.

[11] Patent Number: 6,013,371
[45] Date of Patent: Jan. 11, 2000

[54] CARBON ARTIFACTS AND COMPOSITIONS AND PROCESSES FOR THEIR MANUFACTURE

[75] Inventors: Joseph W. Hager, Dayton, Ohio; John W. Newman, Ashland, Ky.; Nicholas Johannes, Zurich, Switzerland; Frank H. Turrill, Huntington, W. Va.

[73] Assignee: MotorCarbon LLC, Palm, Harbor, Fla.

[21] Appl. No.: 08/975,421

[22] Filed: Nov. 20, 1997

[51] Int. Cl.$^7$ .................................................... B32B 9/00
[52] U.S. Cl. ...................... 428/408; 264/29.2; 264/29.7; 264/115.125
[58] Field of Search ........................ 428/408; 264/29.2, 264/29.7, 115, 125

[56] References Cited

U.S. PATENT DOCUMENTS

| | | | |
|---|---|---|---|
| 4,361,500 | 11/1982 | Mathe et al. | 252/430 |
| 4,671,907 | 6/1987 | Iwahashi et al. | 264/29.5 |
| 4,883,617 | 11/1989 | Benn et al. | 264/29.7 |
| 5,498,585 | 3/1996 | Bartels et al. | 502/185 |

*Primary Examiner*—Christopher Raimund
*Attorney, Agent, or Firm*—Richard Coale Wilson Jr.

[57] ABSTRACT

Producing of near net shape carbon (optionally carbon—carbon composite) pistons and other artifacts by sintering (with or without carbon fibers, preferably pitch-based carbon fibers and most preferably blends of vapor grown carbon fibers(VGCF)) homogeneous powders derived from petroleum pitch. The powders preferably exhibit properties equal to or exceeding those of POCO AXF-5Q. Preferred specific technical steps are substantially as follows:

1. Individually prepare, by evaporation, heat treating and/or oxidizing of carbon-containing pitches, followed by oxidizing, comminuting and/or spray drying, to produce sinterable pitch powders (and optionally create uniform dryblends of pitch powder with various fractions of vapor-grown or other carbon fiber.)
2. Produce near net shape carbon—carbon artifacts, such as cup shapes which are convertible to internal-combustion (i-c) pistons with minimal machining, by pressing or injecting into molds, then sintering and carbonizing. Both uniaxially (e.g. injection molded) and isostatically compacted powder blends, can be employed.

Related apparatus, compositions and artifacts are also taught.

21 Claims, 3 Drawing Sheets

CARBON PISTON

CARBON ARTIFACTS AND COMPOSITIONS AND PROCESSES FOR THEIR MANUFACTURE

RELATED APPLICATIONS

I. Field of the Invention

The present invention relates to the general field of manufacture of artifacts, most preferably engine pistons, from carbon and related processes and compositions.

II. Description of the Prior Art

The following references are understood to be relevant to the field of the invention:
1 P. Greiner, German Patent DE 3605918, Feb. 25, 1986.
2 P. Greiner, German Patent DE 3638533, Nov. 11, 1986.
3 P. Greiner, and H. Pflueger, "Piston Engine", European Patent 0258330B1, May 5, 1992.
6 A. H. Taylor, "Lightweight Piston", U.S. Pat. No. 4,683,809, August 1987.
7 A. H. Taylor, "Composite Piston", U.S. Pat. No. 4,736,676, April 1988.
8 A. H. Taylor, "Lightweight Piston Architecture", U.S. Pat. No. 4,909,133, March 1990.
9 K. H. Jones, "Carbon—Carbon Piston", TOPS Exhibit Y-630 available at http.//tag-www.larc.nasa.gov/tops/tops.html, Sep. 20, 1995.
10 A. H. Taylor and P. O. Ransone, "Advanced Carbon—Carbon Piston Development Program—a Status Report", Proceedings of the 13th Conference on Metal matrix, Carbon, and Ceramic Matrix Composites, NASA CP 3054 Part 2, pp. 451–472, 1990.
11. The "Aerocarb" pitches. Aerocarb is a registered trademark of Ashland, Inc. The series of Aerocarb pitches produced by Ashland's technology are also designated in an abbreviated form as A-60-A-80, etc., denoting their percent carbon.
12 S. Chwastiak, U.S. Pat. No. 4,209,500, Jun. 24, 1980.
13 W. R. Hoffmann and K. J. Huettinger, Carbon 32(6) 1087 (1994).
14 A. Gschwindt and K. J. Huettinger, Carbon 32(6) 1105 (1994).
15 L. Singer, U.S. Pat. No. 4,005,183, January 1977.
16 W. R. Sawran, F. H. Turrill, J. W. Newman and N. W. Hall, U.S. Pat. No. 4,497,789, February 1985.
17 W. R. Sawran, F. H. Turrill, J. W. Newman, N. W. Hall and C. Ward, U.S. Pat. No. 4,671,864, June 1987.
18 C. Ward, E. Chao, R. E. Booth, F. H. Turrill, R. H. Wombles, J. W. Newman and W. P. Hettinger, Jr., U.S. Pat. No. 4,927,620, May 1990.
19 D. C. Berkebile, D. M, Lee, L. D. Veneziano, J. J. Lauer, R. E. Booth and W. P. Hettinger, U.S. Pat. No. 4,996,037
20 R. P. Krock, D. Carlos and D. C. Boyer, "Versatility of ShortPitch-Based Carbon Fibers in Cost Efficient Composites," 42nd Annual Conference, The Society of the Plastics Industry, Feb. 2–6, 1987.
21 W. P. Hettinger, Jr., R. P. Krock and D. C. Boyer, "Low Cost Carbon Fiber a Promising New Filler for Rubber," ACS Symposium on Recent Developments in Black and Non-Black Fillers, May 26–28,1987.
22 W. P. Hettinger, Jr., J. W. Newman, M. D. Kiser and D. D. Carlos, "A Cost Effective Conductive Carbon Fiber for Composite Applications," ACS Meeting, Denver, Colorado, Apr. 6–10, 1987.
23 W. Huettner, R. Wolf, J. Heuer, and P. Greiner, Erdoel ErdgasKohle 107, 81 (1991).
24 Nagayama, T Torii, H. Hatano, and N. Fukuda, Extended Abstracts, 20th Biennial Conference on Carbon, Santa Barbara, Calif.(1991), p. 206
25 W. C. Schwemer, U.S. Pat. No. 4,071,604, January 1978.
26 I. Mochida, Y. Sakai, H. Otsuka, U.S. Pat. No. 4,891,126, January 1990.
27 K. Behrenbeck and K. J. Huettinger, Extended Abstracts, 19th Biennial Conference on Carbon, Pennsylvania State University,University Park, Pa. (1989), p. 174.
28 M. Harder and K. J. Huettinger, Extended Abstracts, Carbone '90, Groupe Francais d'Etudes des Carbones (1990), p. 334.
29 US Army Contract DAAH04-96-C-0058, "Low Cost High Strength Structural Carbon Solids Derived from Solution Processing of Pitch Powders", awarded July 1996

III. Problems Presented by the Prior Art

None of the above prior art is understood to teach an integrated evaporation, heat treat/oxidizing process for transforming selected pitches into moldable, sinterable powders capable of being processed into low coefficient of thermal expansion, near net shape artifacts, such as carbon pitches.

SUMMARY OF THE INVENTION

According to the invention, producing of near net shape carbon (optionally carbon—carbon composite) pistons and other artifacts by sintering (with or without carbon fibers, preferably pitch-based carbon fibers and most preferably blends of vapor grown carbon fibers(VGCF)) homogeneous powders derived from petroleum pitch. The powders preferably exhibit properties equal to or exceeding those of POCO AXF-5Q. Preferred specific technical steps are substantially as follows:
1. Individually prepare, by evaporation, heat treating and/or oxidizing of carbon-containing pitches, followed by oxidizing, comminuting and/or spray drying, to produce sinterable pitch powders (and optionally create uniform dryblends of pitch powder with various fractions of vapor-grown or other carbon fiber.)
2. Produce near net shape carbon—carbon artifacts, such as cup shapes which are convertible to internal-combustion (i-c) pistons with minimal machining, by pressing or injecting into molds, then sintering and carbonizing. Both uniaxially (e.g. injection molded) and isostatically compacted powder blends, can be employed.

Related apparatus, compositions and artifacts are also taught.

I. GENERAL STATEMENT OF THE INVENTION

To produce any manufactured component economically, its constituent material must exist in abundance and the material must be readily converted to a net shape. The least expensive metal and polymer components, for example, are castings and injection molded thermoplastics. Where solid-to-liquid-solid conversions are not practical, such as in ceramics and some metal systems, sintering compacted powders provides a net shape processing alternative.In the form of petroleum and coal hydrocarbons, carbon is an abundant raw material. Yet carbon can neither be melted nor sintered in the conventional sense, and thus net shape processing is problematic. Pitches, mixtures of polycyclic aromatic hydrocarbons, are thermoplastic and, depending on the hydrogen mole fraction, can be melted and molded to net shape. But the conversion of the pitches to solid carbon requires the diffusion of large amounts of hydrogen and alkanes from the interior of a solid body. The production of electrode graphite uses powdered coke and fuses it together with the aid of a binder pitch. Although this approach significantly increases the effective char yield, the outgassing process produces substantial shrinkage and can take months in a thick section, if shrinkage cracking is to be avoided. The present invention conducts reaction sintering of stabilized semicoke powders derived from commercially available petroleum pitch and/or, less preferably, coal tar pitch.

The incorporation of vapor grown carbon fibers can further enhance the effective char yield, while also providing a composite reinforcing effect. Since the fibers are discontinuous, they are mobile and thus do not inhibit local matrix shrinkage, a phenomenon which leads to matrix cracking in continuously reinforced carbon—carbon. Rather than processing thick billets, the powder-fiber blends are molded to near net shape, which in the case of pistons and many other components means low section thickness. Since diffusion time increases with the square of the diffusion length, a body with a section thickness of one half inch can be expected to outgas at a rate of over 250 times that of an eight-inch diameter billet, in the process of converting pitch to carbon. Near net shape carbon—carbon pistons processed by the methods taught herein, represent a high volume mass production technology whose spin-off into the military sector can dramatically reduce the unit cost of aerospace components from rocket nozzles to brakes.

Carbon—carbon composites have also been considered for use as piston materials. Developed primarily for military rocket nozzle and ballistic missile re-entry applications, the current major use of carbon—carbon materials is in aircraft brakes. Carbon—carbon composites exhibit similar thermal stability to graphite but possess higher mechanical properties. Because carbon fiber is highly anisotropic it is also possible to tailor the coefficient of thermal expansion in a carbon—carbon body by controlling fiber architecture.

Development of carbon—carbon pistons has been conducted at NASA. To date, carbon—carbon pistons have been fabricated by machining from billets for a Briggs and Stratton 12.57 cubic inch, five horsepower, air-cooled, four-stroke engine and for a Stihl 090 8.36 cubic inch, ten horsepower, air-cooled, two-stroke chain saw engine. Several fabrication methods have been used for the NASA carbon—carbon pistons. Simply machining the pistons from carbon—carbon billet reportedly produces pistons with adequate strength and thermal properties, and can produce equivalent power output to the pistons they replace. Notwithstanding the clear advantages that carbon pistons offer in reducing pollution in internal combustion engines, there are simply no currently available manufacturing methods which will enable the affordable mass production of material with sufficient mechanical properties. According to automobile industry estimates, manufacturing costs for carbon pistons should not exceed about $8 per pound. While POCO carbon graphite possesses sufficient properties, the production of billet is time-consuming and the finished pistons can exceed this target price by ten- to one hundred-fold. Similar observations can be made for carbon—carbon materials, particularly when the reinforcing fibers themselves exceed $20/lb. Implementation of carbon pistons in I-C engines therefore has awaited the invention of appropriate near netshape processing of inexpensive carbon precursor materials.

It is also an object of the invention to provide a low-cost manufacturing method for producing near net shape carbon—carbon composites with discontinuous fiber reinforcement. This powder-processed material can be a hybrid carbon—carbon composite, incorporating short fiber reinforcement with VGCF or other carbon fiber while also exploiting the graphite-forming capabilities of isotropic pitch. Such carbon—carbon composites will exhibit mechanical performance superior to, or at least comparable to, commercial graphite. As assessed in the Utilities section, the market for pistons is immense.

This invention which enables the production of net shape, low cost, carbon—carbon artifacts has a wide variety of potential applications in the defense and commercial sectors. The most preferred application is carbon pistons. The worldwide market for pistons is immense and a near-term utility is the sport and utility engine market. These are the low horsepower two- and four-cycle engines which power lawnmowers, garden tractors, motor bikes, outboard motors, snowmobiles, etc. Although these do not constitute the largest market, they are the ones for which pollution control measures are most desperately needed. Furthermore the piston structural requirements for these engines are not nearly so stringent as they are for the automotive sector. Properties which can be incorporated into carbon pistons are also of interest for defense applications. The availability of low cost near net shape carbon and carbon—carbon enable this material to be used where carbon was preferred but was formerly precluded by its high cost. The worldwide market for pistons as components of internal combustion engines and other passenger and commercial vehicle uses and for sport and utility applications and other applications e.g. hand and machine tools.

Products of the invention include moldable sinterable compositions adapted for making near net shape carbon artifacts having coefficient of thermal expansion less than about $15 \times 10^{-6}$ reciprocal degrees Centigrade.

Where the starting material is a lower softening point pitch, the process comprises evaporating the pitch as necessary to provide a pitch having a carbon value of at least about 70, as measured by ASTM D2416 and a softening point of at least about 400 degrees F. (200 degrees C.);

The preferred step is thereafter to heat treat said pitch at about 250–450 degrees Centigrade for about 0.1–10 hours; and/or oxidize said pitch at about 100–600 degrees Centigrade for about 0.1–10 hours, to produce a carbon composition having a higher softening point than said pitch; and thereafter to solidify as necessary and comminute as necessary to provide an average particle size of about 0.5–5 microns to produce a moldable sinterable carbon composition.

The preferred product of the inventive process is a moldable, sinterable powder composition for making carbon artifacts having coefficient of thermal expansion less than about $15 \times 10^{-6}$, comprising carbon particles having a carbon content of at least 90%, a quinoline insolubles content of at least 20% by weight, and average particle size of about 0.5–5 microns.

Starting Materials:

Pitch: The preferred starting material for the present invention is Ashland Petroleum Co. A240 pitch because of its commercial availability, high carbon content and well-known properties, other grades can be substituted. Where commercially available, A80 pitch will be particularly useful because it carbon content is about 80 percent or above, thus saving evaporation requirements. Even more preferably, powder will be prepared from Aerocarb "80" pitch, which is produced under license of the Ashland synthesis technology. Several higher char yield variants of the A-80 can also be prepared by thermal treatment of the as-received material. Such treatments will also induce mesophase formation, which may then be evaluated for suitability for the intended purpose of the finished artifact. Aerocarb 80 is one member of a family of pitches derived by means of a patented controlled evaporation of Ashland's commodity pitch, A-240. Aerocarb 80, while still isotropic, is on the verge of becoming mesophase, and has a density of 1.26 g/cm3, a Tg of 224° C. and a softening point of 258° C. Produced as a spinnable precursor for Ashland's "Carboflex" isotropic pitch fiber, its physical properties are similar to those of Mitsubishi AR, a synthetic mesophase pitch derived from napthalene. Yet, the simple processing and extremely low cost of the A-240 precursor enable A-80 to be priced at less than the AR. The preferred A-80 pitch which will be used as the basis for this work is isotropic but on the verge of becoming mesophase.

(For these pitches, A-60 and A-80, etc. designates the minimum carbon value in weight percent as measured by ASTM D-2416). Aerocarb 80 is incipient mesophase, and the last of this pitch family which is isotropic. Mesopitch, a highly anisotropic pitch which measures 89–91 weight percent carbon in the Conradson test, is also derived from A-240 but is prepared using the teachings of the above Chwastiak reference in a patented process also used to prepare the precursor to high modulus pitch fibers. The heat treated pitch variants of the A-80 provide the effect of partial anisotropy of the pitch on the sinterability and ultimately on the desired carbon properties Binder: As described in Example 3, binders, most preferably phenolic, can be added to the moldable powder for injection molding or to improve characteristics for isostatic pressing. Various other binders can be used comprising phenolics, A80 pitch and any other binder which can be converted to carbon during the carbonizing step.

Carbon Fibers: Vapor grown carbon fiber has been a curiosity for over 100 years. Applied Sciences, Inc. has been involved in the research and production of vapor grown carbon fiber for over ten years. Research has focused on the optimization of growth conditions, catalysts, and scale up of the process. In addition, composite fabrication and testing of VGCF in organic, metal, ceramic, and carbon matrix composites have been carried out. Fiber development led to the creation of continuous carbon fiber reinforced carbon matrix composites (carbon—carbon). In carbon—carbon, fibers can bridge cracks, thus leading to greatly enhanced fracture toughness and strain-to-failure. For this reason, military technologists have embraced carbon—carbon for high performance applications such as rocket nozzles and ballistic missile warhead re-entry. Later, it was discovered that carbon—carbon also makes an excellent friction material for aircraft brakes, and this application has become the primary use. The cost and complexity of producing high density carbon—carbon composites remains extraordinarily high, causing designers to dismiss it in all but the most stringent applications where nothing else will work. Because of the inherent simplicity of the vapor grown carbon fiber process, it is possible to supply a highly graphitic fibrous carbon reinforcement for composites at a commercial price. Since VGCF is discontinuous, it is also moldable, which opens the possibility of very low-cost processing. Incorporation of 30 weight percent VGCF in a polypropylene matrix injection molded composite has resulted in a approximate doubling of the tensile strength and quadrupling of the stiffness. The conventional method for producing carbon solids has been to grind coke into a powder, blend it with a binder pitch, mold it into billets and then carbonize and graphitize the solids. These latter heat treatment steps serve to convert the thin layer of binder pitch between adjacent coke particles into graphite and fuse the entire mass together. The quality of carbon solids produced by this method can be improved by reducing coke particle size, multiple reimpregnation/carbonization cycles and carbon vapor impregnation (CVI) densification. Even with such careful processing, though, the billet remains a brittle material with low fracture toughness and low strain-to-failure.

The development of high strength PAN and pitch carbon fibers began in the 1960s. In fact, fiber development stimulated the original interest in polyaromatic mesophase, viewed as a spinnable precursor for ex-pitch carbon fibers. When anisotropic pitch is baked and heat treated, it produces carbon with a high degree of graphitization. This phenomenon is the basis for the above-referenced original Singer patent describing the production of ex-pitch carbon fiber and the motivation for the synthesis from A-240 of a low molecular weight 100% mesophase material described by the Chwastiak reference. This polyaromatic mesophase pitch material is the presumed precursor to the Amoco P series fibers. More recently, researchers at Ashland Inc. produced and reported a pitch precursor which was entirely isotropic or "incipient mesophase". The resultant product, Aerocarb 80, has an 80% char yield but is still spinnable. This material is the feedstock for the Ashland isotropic fiber known as Carboflex.

In on-going research at the Air Force Wright Laboratory, VGCF has also been used as a reinforcement for phenolic matrix composites which were subsequently carbonized. High shrinkage resulted in high fiber volume fractions as the fibers moved with the matrix. During the last twenty years, there has been a renewed interest in producing high strength fine grained isotropic carbons, this time using a binderless sintering process. The late Warren Schwemer described a method of converting an Ashland A-240" pitch into "anamorphous, substantially infusible plastic" possessing 3–11% volatiles in his above patent. The plastic precursor was ground into powder, compacted and sintered together prior to carbonization. Initially isotropic, the heat treated solid clearly exhibits evidence of graphitization. Apparently the mesophase is created subsequent to compaction as domains in the individual powder particles. The starting material for most of the remaining work in sintered precursors has typically been polyaromatic mesophase pitch, either derived from A-240 pitch or from synthetic pitches derived from napthalene. Because of problems encountered in sintering, the flexural strength of the samples produced in the early attempts never exceeded 100 MPa. Recently, investigators have been having more success. To overcome the poor sintering properties of the mesophase pitch powders, a pressurized sintering process under hydrogen was developed. Postulating surface hydrogenation and liquid phase sintering at 550 C, the authors were able to achieve flexural strength up to 150 Mpa. Treating mesophase powders with hydrogen increases the plasticity of the particles and improves sinterability. Which pitch precursor is better suited to produce a high strength graphite matrix for a carbon—carbon composite, isotropic or mesophase? Certainly, both precursors go through some transformation to a polyaromatic mesophase on their way to becoming graphite. The technical issue is to establish an optimum process for the desired product artifact which enables precursor powder to be fused and then converted to the ideal crystalline form during subsequent heat treatment. The process which enables this transformation at the lowest possible cost will win this competition. Since Aerocarb 80 can be purchased for less, it offers the least expensive pitch precursor for carbon pistons. If desired for the particular application, the Aerocarb 80 can be converted directly to mesophase by further thermal treatment prior to processing into powder.

Process Steps:

Evaporating: The evaporation step is preferably accomplished in a simple evaporator, more preferably in a wiped film evaporator which removes volatiles with minimum heating, most preferably under vacuum. Suitable evaporators are manufactured by Pfaudler and by Artisan Industries. Preferred temperatures are 400–475, most preferably 425–450 degrees C.; preferred times are from 0.1 to 1000 minutes, more preferably 1–100 minutes, and preferred product carbon contents are at least 80%, more preferably above 85% and most preferably above 90% C.

Emission Treatment: Off gases are preferably scrubbed, more preferably partially condensed and most preferably incinerated, to avoid VOC (volatile organic compound) emissions.

Heat Treatment: Heat treatment as shown in FIG. 1 is a preferred step in the invention. Preferred temperatures for heat treatment are 200–500; more preferably 250–450 and most preferably 300–400 degrees C. Preferred times are 0.1–10, more preferably 0.5–5; and most preferably 1–2 hours, usually largely dependent on the temperature and the product properties desired.

Prilling/Spray Drying: As shown in FIG. 1, the prilling or spray drying step will preferably be conducted before oxidizing, at a temperature of 225–475, more preferably 250–450, and most preferably 400–450 and adjusted to produce an average particle size of 10–100, more preferably 15–50, and most preferably 30–50 microns.

Stabilization by Oxidation and/or Comminuting: Since the pitch powder is a thermoplastic which is susceptible to bloating during carbonization, it is preferably stabilized prior to this processing step. Preferably, the stabilization of the powders is performed in a circulating air convection oven or chamber at temperatures of about 150–300, more preferably 190–240° C. Agglomerated clumps, which are formed as the consequence of localized hot spots produced during this exothermic oxidation process, can be comminuted, e.g. by passing them through the jet mill a second time. This second comminution has the added benefit of breaking through the encapsulating oxide layers and exposing fresh pitch surface for availability during the sintering process.

Cominuting: The creation of powder from the evaporated, heat treated/oxidized product can be easily achieved with the use of a jet mill, and this is the preferred method of comminution. For example, grinding in a Microjet 4 laboratory mill manufactured by Fluid Energy Aljet, has been found to produce a remarkably uniform spherical particle size distribution. Fine particle size and particle uniformity are deemed essential to the creation of carbon artifacts free of large flaws. A filter or most preferably, a cyclone can be used to control particle size by recycling oversize particles. A-80 pitch is most preferably milled in a Microjet 4 mill by Fluid Energy Aljet. Temperature for this comminuting after stabilization is not narrowly critical, but will preferably be ambient, more preferably about −20 to 60, and most preferably 0–40 degrees C. and average particle size will be about 0.1–10, more preferably 0.7–7, and most preferably 1–2 microns.

Pressing: A broad range of compaction pressures can be used with, preferably with a standard 50 ton per square inch uniaxial die set such as that designed for the cold powder compaction studies in accordance with ASTM B 312 and Metal Powder Industries Federation standard MPIF 15. This die set is preferably used to fabricate the artifacts. The green strength and green density of the compacts are preferably measured as functions of compaction pressure. Cold isostatic pressing (CIP) is a more preferred method of consolidating the powder into a partially dense compact. In the case of CIP, the powder is placed in an elastomeric bag or mold and the bag is subjected to external hydrostatic pressure which forces the powder against a hardened metal mandrel. A cold isostatic pressing facility is used to fabricate appropriate bags and tooling mandrels to compare the green strength of bars prepared from uniaxial compression with cold isostatic pressing.

These powders are substantially as easy to consolidate as the powders produced for powder metallurgy, for testing it is preferable to use the standard short beam specimen described in ASTM B 312 and ASTM B 610. This specimen, measuring 10.25"×0.5"×0.25", is commonly used in the powder metallurgy industry to measure the green strength of cold compacts as well as the strength of sintered solids, and to study dimensional changes during sintering.

Mixing small amounts of unoxidized or slightly oxidized pitch into an oxidized powder aids in sintering without bloating.

Without being held to any particular theory, the unoxidized phase may take-up oxygen from the oxidized particles during the heat-up. Possibly the unoxidized phase melts upon heating (or pressing) and fills the interstitial spaces. The high contact surface area then allows rapid diffusion of un-bound oxygen into the unoxidized phase, resulting in its stabilization during the heating ramp.

A. Molding: The pitch powder processing technology can be used to create cup-shaped cylinders which simulate near net shape pistons. After preparing a suitable design for the desired artifact, an appropriate mold die is fabricated, i.e. the elastomeric bags and a matching mandrel are fabricated for use in cold isostatic pressing of the VGCF-pitch powder blends. Compacted specimens are then subjected to the sintering and carbonization protocols which proved most successful for the particular formulations prepared in Examples 1 and 2. Mass and dimensional changes are monitored as a function of process step, to establish the optimum formulation and conditions for making net shape parts. By "moldable" is meant that the compositions of the invention are sufficiently plastically deformable so that they can self-adhere to form a shape having sufficient strength to permit handling and sintering.

For isostatic pressing, pressures are preferably about 1–10,000, more preferably 200–1000, and most preferably 250–500 atmospheres.

B. Injection Molding. Apparatus and conditions for injection molding are generally conventional; pressures are preferably 100–1250, more preferably 200–1000, and most preferably 250–500 atmospheres and temperatures are preferably 0–100, more preferably 20–110 and most preferably 25–90 degrees C.

Quality Control: For product uniformity and meeting of specifications, four types of characterization tests are preferably performed on the artifacts; physical, morphological, mechanical and thermal. Physical characterizations are preferably conducted during and after the completion of processing. The dimensional and mass changes brought about by each of the processing steps are closely monitored. Of particular interest is the percent mass gain during oxygen stabilization and the percent char yield during carbonization. The apparent density will be closely monitored to assure process uniformity, and to correlate with the measured mechanical properties. Scanning electron microscopy (SEM) is used to examine selected fracture surfaces of the artifacts to obtain indications of fracture type. Polished specimens of the compacted fiber-powder rectangular blocks can be examined under crossed polarizers to determine existence of mesophase. Samples are preferably vacuum impregnated with an epoxy potting resin incorporating a fluorescing component. Once solid, one surface is preferably ground and polished using conventional metallographic techniques. Optical microscopy will be performed, giving indication of the extent and characteristics of the open porosity. Samples with rectangular cross section will be tested in three point flexure to determine the transverse rupture strength of the compact in accordance with ASTM B 538. To correlate hardness with rupture strength, the Rockwell L hardness of the representative specimens is preferably determined in accordance with ASTM C748. The effect of any fiber volume fraction and density on the CTE (coefficient of thermal expansion) is preferably determined using a method similar to ASTM E228. Preferably the products of the invention will have coefficient of thermal expansion (CTE) below $15 \times 10^{-6}$, more preferably below $10 \times 10^{-6}$ and most preferably below $8 \times 10^{-6}$ reciprocal degrees C.

Sintering: The compacted specimens, formulated to have sufficient green strength for handling, are sintered in inert gas, meaning that they are heated to temperatures sufficient to cause solid state fusion of the pitch particles without full liquation. For the more preferred carbon compositions of the invention, optimum sintering takes place from about 250–700, preferably 350–550 and most preferably 400–500° C.

The net shape processing sequence preferably comprises the steps shown in FIG. 2. The sinterable powders optionally may be uniformly blended with VGCF, other carbon fiber, graphite powders or even metal powders.

The powder is preferably oxygen stabilized to prevent bloating during carbonization, yet not so oxidized that it prevents sintering. The powder particles must also remain plastic enough to deform during compaction. Any fibers or powders are preferably debulked in a manner which breaks up clumps, so that individual fibers may come in contact with the powders during dry blending. If the fiber and powder preparation and blending are done correctly, compaction may be carried out with either uniaxial compression for simple shapes or cold isostatic pressing for more complicated shapes. Since the pitch powder is a thermoplastic which is susceptible to bloating during carbonization, it must be stabilized prior to this processing step. Preferably, the stabilization of the powders is performed in a circulating air convection oven at temperatures of about 150–300, more preferably 190–240° C. Agglomerated clumps, which are formed as the consequence of localized hot spots produced during this exothermic oxidation process, will preferably be comminuted by passing them through the jet mill a second time. This second comminution has the added benefit of breaking through the encapsulating oxide layers and exposing fresh pitch surface for availability during the sintering process.

Fiber Processing—Vapor grown carbon fiber (VGCF) has been frequently described in the carbon literature and is available in quantity from Applied Sciences, Inc. of Cedarville, Ohio under the brand name Pyrograf III. The Pyrograf III fiber is a discontinuous highly graphitic fiber with a unique annular morphology, which is frequently hollow. It is typically 0.1 to 0.2 microns in diameter with a length to diameter ratio in the hundreds to thousands As-received VGCF will be either ball- or jet-milled to break down clumping or "bird-nesting" common in such fine, high aspect ratio fibers. When debulked in this fashion, the fibers appear to be a dark fluffy powder when viewed without magnification. In this form, the pitch powders, which are 0.5 to 2.0 µm in diameter can come in direct contact with the individual 0.1 to 0.2 µm diameter fibers. The pitch powder, being electrically non-conducting, is very susceptible to tribocharging which enhances adherence to the fibers in the blending process.

Fiber/Powder Blending—For carbon—carbon artifacts, different fiber-powder ratios over the full spectrum of fiber volume fractions can preferably be tested to determine the optimum range of blending processability and to identify the advantages and difficulties in subsequent processing caused by certain volume fractions. An option is blending the fibers with the matrix is simply shaking the two constituents togetherin a plastic bag, to blending in a kitchen mixer, tumbler, ballmill and/or fluid energy mill.

Carbonizing: In the same or in a different furnace, the sintered bodies will be slowly carbonized in an inert gas to convert the pitch to carbon, and to permit outgassing and overall shrinkage of the bodies. For maximum mechanical properties for sintered carbon powders, this baking/carbonization step is performed at about 800–2000, more preferably 1000–1500 and most preferably 1100–1400° C. for from 0.1–500, more preferably 1–100, and most preferably 1–10 hours. Thicker articles require a 6. A composition according to claim 2 having substantially greater combination of time and temperature. Preferred furnaces include those made by Harper Furnace Co.

Machining: Because it is generally the most expensive operation to be performed on the artifacts, machining is preferably kept to a minimum. This is possible because of the dimensional stability of the artifacts formed by the invention. Near net shape molding of the carbon powders followed by carbonizing can provide artifacts sufficiently close to the desired tolerances that they can be used after simple grinding or electrical discharge milling or conventional milling. Automated machining is preferred to reduce unit costs.

Batch or Continuous: While certain of the steps are described as practiced on a preferred continuous basis, the invention is also applicable to practice on a batch basis.

Table A sets forth preferred parameters of the invention:

TABLE A

| Parameter | Units | Preferred | More Pref. | Most |
|---|---|---|---|---|
| Pref. Start.Material |  |  |  |  |
| Pitch | type | A240 | A80 |  |
| devolatilized |  |  |  |  |
| A80 (~A90) |  |  |  |  |
| Binders | comp. | phenolic | A240 A80 |  |
| CarbonFibers | type | PAN | pitch | vaporgrown |
| ProcessSteps |  |  |  |  |
| Evaporating |  |  |  |  |
| temperature |  | 400–475 | – | 425– |
| C. |  |  |  | 450 |
| apparatus | type | pot, still |  | WFE |
| EmissionTreat. | type | scrub | condense | incinerate |
|  |  |  | or cat. |  |
|  |  |  | oxid. |  |
| HeatTreat. |  |  |  |  |
| temp | C. | 200–500 | 250–450 |  |
| 300–400 |  |  |  |  |
| time | hrs | 0.1–10 | 0.5–5 |  |
|  |  |  | 1–2 |  |
| Prilling/attrit. |  |  |  |  |
| before oxid. |  |  |  |  |
| temp. | C. | 225-475 | 250-450 | 400-450 |
| avg.part. | micron | 10-100 | 15-50 | 30-50 |
| size |  |  |  |  |
| Stabilizing |  |  |  |  |

TABLE A-continued

| Parameter | Units | Preferred | More Pref. | Most |
|---|---|---|---|---|
| by Oxidizing | | | | |
| apparatus | type | belts,trays, fluid bed | — | fluid |
| bed | | | | |
| temp. | C. | 150–300 | 175–250 | 190–230 |
| oxidizer | compos. | oxygen, NO2,etc. | — | air |
| time | hours | 0.01–100 | 0.5–10 | 0,05–1 |
| Comminuting (after oxid.) | | | | |
| mill | type | jet/ filtering | | |
| jet/ cyclone | | | | |
| avg part size | micron | 0.1–10 | 0.7–7 | 1–2 |
| temp. | C. | ambient | minus 20–60 | 0–40 |
| Pressing | type | uniaxial | isostatic | |
| pressure | atm | 1–10,000 | 100–6000 | 100–300 |
| Inject.Mold. | | | | |
| pressure | atm | 100–1250 | 200-1000 | 250-500 |
| temp. | C. | 0–100 | 20–110 | 25–90 |
| Sintering | | | | |
| temp. | C. | 200–600 | 250–500 | 200–350 |
| Fiber Process. | type | melt spun | oxidized green fiber melt blown/ vapor grown | |
| Fiber/Pow.Blender | | type | dry blender fiberflinger" | |
| — | | | | |
| Carbonize | hrs | 0.1–500 | 1–100 | 1–10 |
| temp | C. | 800–2000 | 100–1500 | |
| 1100–1400 | | | | |
| Machining none | removal | some | little | |

II. UTILITY OF THE INVENTION

This technology is particularly useful for carbon pistons. As illustrated in FIG. 8, the worldwide market for pistons is immense, and includes the sport and utility engine market. These are the low horsepower two- and four-cycle engines which power lawnmowers, garden tractors, chain saws, motor bikes, outboard motors, snowmobiles, etc. Although these do not constitute the largest market, they (especially 2-cycle applications where oil is added to the fuel) are the ones for which pollution control measures are most urgently needed. Pistons with still higher properties are needed in the automotive sector and in defense applications. The availability of low cost near net shape carbon—carbon artifacts will enable this material to be used in applications where carbon was preferred but was previously precluded by its high cost. The largest worldwide market is for pistons as components of internal combustion engines for passenger and commercial vehicles and sport and utility applications. Other utilities comprise most of the present uses of carbon—carbon composites. Carbon—carbon composites are enabling materials for ballistic missile warhead re-entry, and also have been used for expendable rocket nozzles and exit cones. Carbon—carbon nosetips and leading edges enable the space shuttle to re-enter the earth's atmosphere safely. The current primary application for carbon—carbon is in aircraft brakes, where the coefficient of friction actually increases with temperature. For laser hardening protection, carbon is the baseline, because it surpasses all other structural materials in the amount of heat absorbed per unit of mass, Q. Recent research in carbon—carbon structural materials focuses on its capability as a lightweight dimensionally stable material, and on the possibility of using it in high thermal conductivity substrates for electronics. Two fundamental problem categories are encountered in the use of carbon and carbon—carbon composites. The first category encompasses the physical limitations of carbon, namely the susceptibility of carbon materials to oxidation at high temperatures, and the tendency to fail in a brittle fashion under mechanical loading.

Other artifacts to preferably be made by the invention include battery separators, e.g. for lithium ion batteries, fuel cell components e.g. separators and electrodes; satellite components, e.g. joints and structural members and various engine parts e.g. valve guides and tappets, turbine bearings, etc. in all of which the dimensional stability will be valuable.

DESCRIPTION OF THE PREFERRED EMBODIMENTS

EXAMPLE 1

(Preparation of the sinterable powder of the invention)

Figure 1:
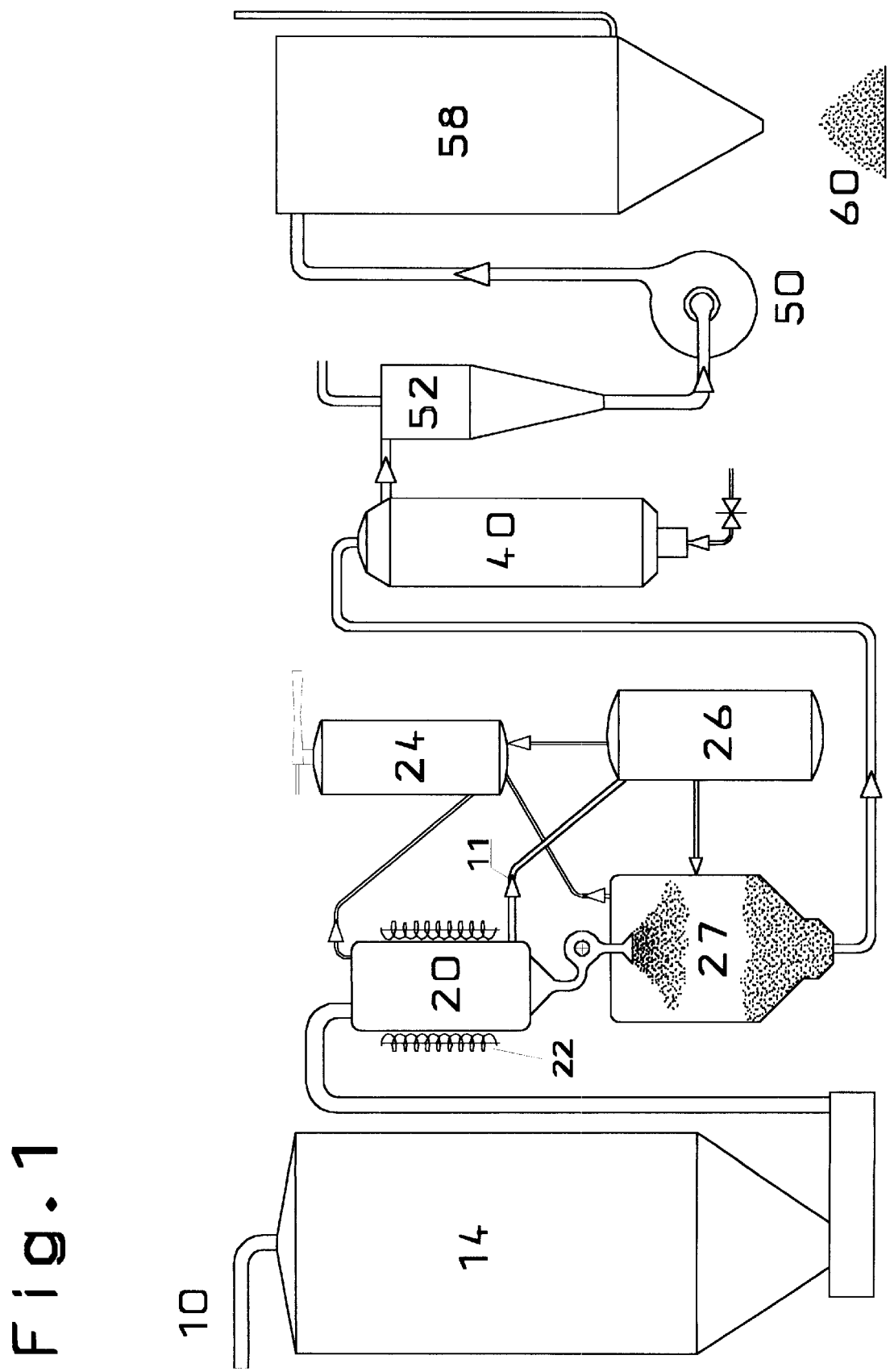
FIG. 1 is a schematic flowsheet of the process of making the power of the invention as detailed in Example 1.

Referring to FIG. 1, a source 10 of commercially available Ashland A240 pitch is received in the molten state and conveyed to pitch holding unit 14 where is kept molten at the temperature of about 400 degrees F. (200 degrees C.) The pitch is conveyed to evaporator 20 which is a wiped film evaporator commercially available from Pfaudler at an operating temperature of about 850 degrees F. (450 degrees C.) under a system pressure of about 15 microns Hg for about 7–10 seconds residence time. (Because mesophase is not objectionable in the compositions of the present invention, a simple evaporator could be substituted.) The evaporator is heated by heating coil 22 and evaporator emissions are treated in a vent system 24 preferably including a vacuum pump aided by a steam eductor. The output from evaporator 20 is fed to heat treatment unit 26 where it is held for about 2.5–10 hours at about 600–1200 degrees F. (315–650 degrees C.). Emissions from heat treatment unit 26 are also fed to the vacuum system 24. Alternately, with efficient WFE operation, product from the WFE 20 will assay 75–85% carbon and can be fed directly to prilling unit 27. Still another alternative is to feed Ashland A80 pitch 11 directly to prilling unit 27.

Product from heat treatment unit 26 is next fed to prilling or spray drying unit 27 which reduces it to a coarse powder having an average particle size of about 20 microns.

Product from prilling unit 27 is fed to oxygen stabilization unit 40 which is a fluidized bed (open trays in an oven could be substituted for a batch stabilization) for a period of about 0.1–10 hours where it is contacted with air at 100–600 degrees C.

Various options are available; the time is, of course, dependent on the temperature in both heat treatment unit 26 and the oxidizing unit 40. Either the heat treatment or the oxygen stabilization may be used alone, although combinations of both are much preferred.

Product from oxygen stabilization unit 40 is sent to jet mill 50 and attached cyclone 52 where it is comminuted by high pressure gas, e.g. air, to an average particle size of about 0.5–5 microns. The comminuted powder tests above 80% by ASTM D 2416 and is sent to powder storage 58 for use in making molded near net shape artifacts.

EXAMPLE 2
(Preparation of the carbon artifacts of the invention)

Figure 2:
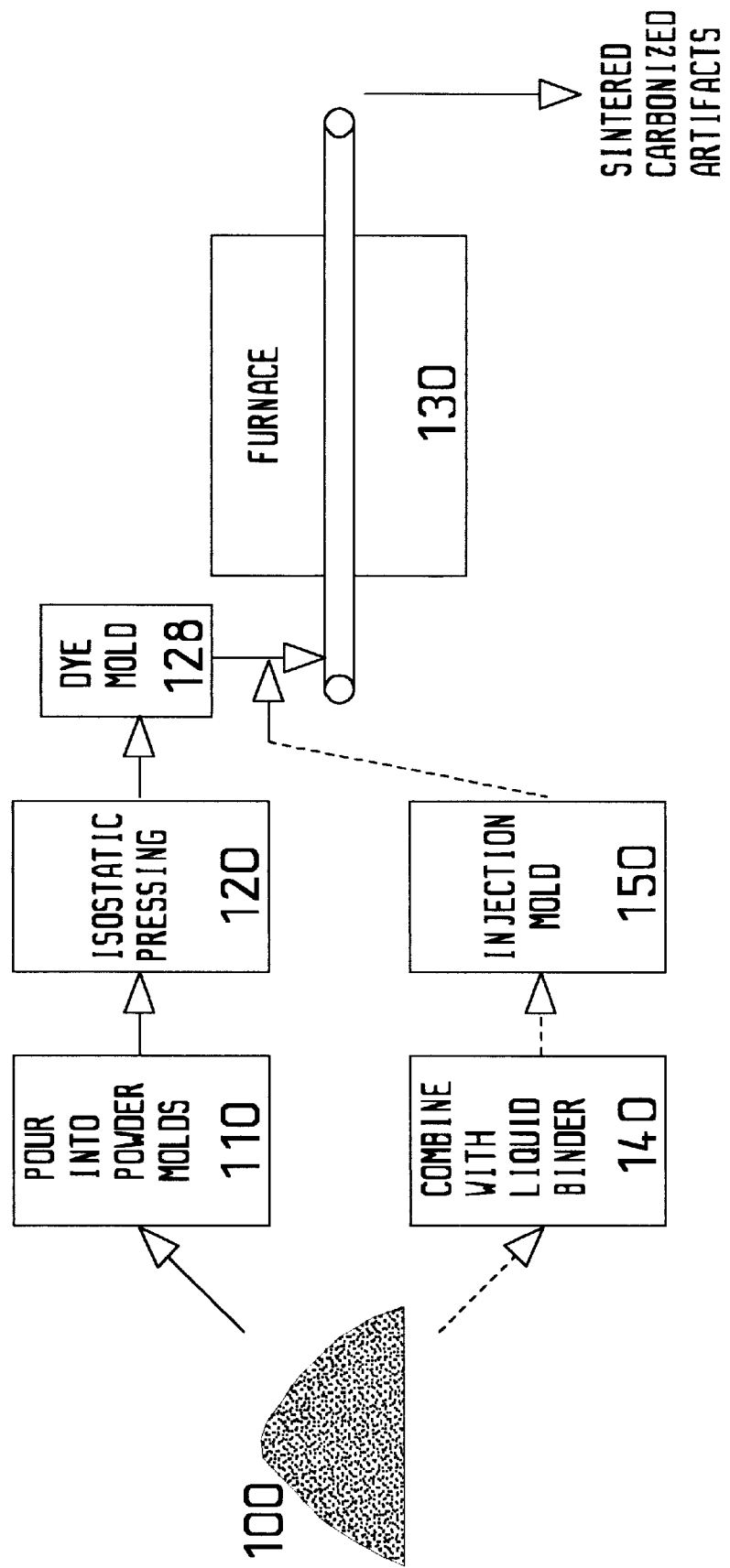
FIG. 2 is a schematic flowsheet of the process of converting the powder of Example 1 into the artifacts of the invention as detailed in Example 2 and also showing an alternate processing scheme.
Figure 3:
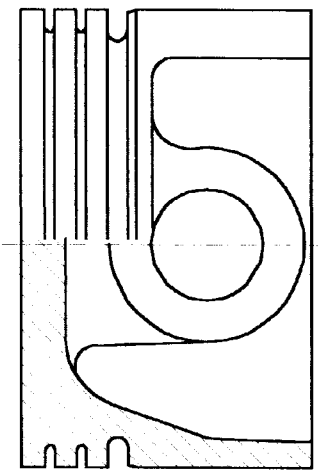
FIG. 3 shows a crossection of a piston manufactured according to the invention which is much lighter than its aluminum counterpart.
Figure 3:
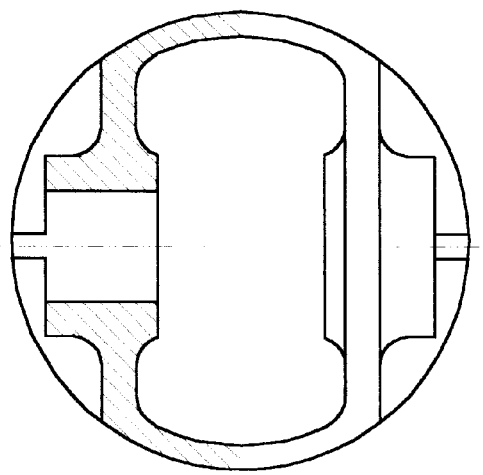

Referring now to FIG. 2, powder 100 such as that produced in Example 1 is poured into individual molds 110. The filled molds are then subjected to isostatic pressing in press 120 which uses a rubber bladder that surrounds the mold and exerts equal pressure in all directions on the powder 100 to be molded. The pressing continues for 20 minutes at a pressure of about 1500 atmospheres. The molds are then processed in demolding step 128, where the molded shapes are released from the molds. These shapes move through multizone moving hearth furnace 130 operating at a start temperature of degrees F. (350 degrees C.) for sintering and finishing carbonizing at 2000 to 2400 degrees F. (1100–1300 degrees C.) for a residence time of about 2 hours to sinter and carbonize the shapes and produce the finished near net shape carbon artifact.

EXAMPLE 3
(Preparation of the carbon artifacts of the invention using binders)

Still referring to FIG. 2 and the other steps discussed in Example 2, in place of (or in combination with) isostatic pressing, the powder 100 can be combined with a binder e.g. phenolic resin, bis oxoazoline, A80 pitch, or the like and injected into injection mold 150 to produce a shape which is demolded in step 128 and sintered and carbonized in furnace 130, as described above.

EXAMPLE 4
(Use in an i-c engine)

When a piston for a 2-cycle lawnmower engine is manufactured according to Examples 1 and 2, with only light machining, it is installed in the engine where it operates with substantially reduced blow-by of oil into the engine exhaust, due to the dimensional stability of the carbon piston.

EXAMPLE 5
(Use in a refrigeration compressor)

When a piston for a sealed oil reciprocating refrigeration compressor is manufactured according to Examples 1 and 2, with only light machining, it is installed in the compressor where it operates with substantially reduced slippage of oil past the piston, due to the dimensional stability of the carbon piston.

EXAMPLE 6
(Use in a scroll compressor)

When a scroll for a sealed oil scroll refrigeration compressor is manufactured according to Examples 1 and 2, with only light machining, it is installed in the compressor where it operates with substantially reduced slippage of oil past the scroll, due to the dimensional stability of the carbon scroll.

Modifications

Specific compositions, methods, or embodiments discussed are intended to be only illustrative of the invention disclosed by this specification. Variations on these compositions, methods, or embodiments are readily apparent to a person of skill in the art based upon the teachings of this specification and are therefore intended to be included as part of the inventions disclosed herein.

For example, electro-spinning of mesophase pitch has been demonstrated at U of Akron and can provide the optimum balance of properties for certain net-shape processed carbon artifacts. This involves spinning 1–5 micron diameter fibers in a controlled manner onto a fine mesh screen pre-form, partially oxidizing the mat, pressing the pre-form isostatically, oxidizing at a higher temperature, then pyrolyzing the resulting oriented fine grained graphitic carbon. These fibers can alternatively be spun onto graphitic foams, compacted, and sintered to form sandwich carbon. The foam is preferably graphited first to take the pressure of compaction, unless exceptionally soft pitch is employed.

Reference to documents made in the specification is intended to result in such patents or literature being expressly incorporated herein by reference.

Variations of the invention include activation of the carbon powder by treating with e.g. carbon dioxide, carbon monoxide, superheated steam, to increase its surface area to above about 1000, more preferably 1000–3000 square meters per gram and preferably producing an average particle size of 0.5–100, more preferably 1.0–50 and most preferably 2–10 microns. This powder can be utilized as an adsorbent in gas masks, vapor recovery systems or the like. Adding noble metals to this activated powder can produce a hydrogen storage adsorbent or catalyst support e.g. for use in nonpolluting vehicle fuel storage systems. The powder is electrically conductive and can be regenerated in situ.

What is claimed is:

1. A process for producing from coke, a moldable sinterable composition adapted for making near net shape carbon artifacts having a coefficient of thermal expansion less than about $15 \times 10^{-6}$ reciprocal degrees Centigrade, said composition comprising carbon particles having a quinoline insolubles content of at least 20% by weight, and an average particle size of about 0.5–5 microns, said process comprising in combination:
    A. evaporating a pitch as necessary to provide a pitch having a carbon value of at least about 70, as measured by ASTM D2416 and a softening point of at least about 400 degrees F. (200 degrees C.);
    B. heat treating said pitch at about 250–450 degrees Centigrade for about 0.1–10 hours; and/or oxidizing at about 100–600 degrees Centigrade for about 0.1–10 hours to produce a carbon composition having a higher softening point than said pitch;
    C. prilling or spray-drying said composition;
    D. thereafter solidifying as necessary and comminuting to a median average particle size of 0.5–5 microns to produce said moldable sinterable carbon composition.

2. A moldable, sinterable powder composition produced according to claim 1, for making carbon artifacts having coefficient of themal expansion less than about $10 \times 10^{-6}$, comprising carbon particles having a carbon content of at least 90%, a quinoline insolubles content of at least 20% by weight, and average particle size of about 0.5–5 microns.

3. A carbon artifact precursor comprising a molded shape comprising a composition according to claim 2.

4. A carbon artifact having a coefficient of thermal expansion less than about $15 \times 10^{-6}$, made by a method comprising pressing and sintering carbon particles having a carbon content of at least about 95%, a quinoline insolubles content of at least 90% by weight and a median particle size of about 0.5–5 microns wherein the carbon particles are made by the process of claim 1.

5. A process according to claim 1 additionally comprising blending into said powder a carbon fiber.

6. A composition of claim 2 having a coefficient of thermal expansion of less than about $8 \times 10^{-6}$ reciprocal degrees centigrade.

7. A composition according to claim 2 having an average particle size of about 0.1–10 microns.

8. A composition according to claim 2 comprising a binder.

9. An artifact precursor according to claim 3 having a coefficient of thermal expansion of less than about $8 \times 10-6$ reciprocal degrees Centigrade and having an average particle size of about 0.1–10 micron.

10. A carbon powder composition according to claim 2 which has been activated so that it has a surface area of about 1000–3000 or more square meters per gram, optionally containing a noble metal.

11. An artifact precursor according to claim 3 having a quinoline insolubles and a carbon content of at least about 90%.

12. An artifact according to claim 4 wherein the artifact is a piston.

13. An artifact according to claim 4 wherein the artifact is a compressor component.

14. An artifact according to claim 4 wherein the artifact is an internal combustion engine component.

15. An artifact according to claim 4 wherein the method of making the carbon particles comprises both heat treatment and oxidation.

16. An artifact according to claim 4 wherein the comminuting step of the method of making the carbon particles comprises jet milling.

17. A process according to claim 1 wherein the pitch is substantially converted to mesophase before molding.

18. An artifact according to claim 4 wherein the method of making the carbon particles comprises sintering at about 200–600 degrees Centigrade after isostatic pressing at 250 to 500 atmospheres.

19. A process for producing a molded near net shape carbon artifact having a coefficient of thermal expansion less than $15 \times 10^{-6}$ reciprocal degrees Centigrade, comprising in combination:

A. providing a pitch having a carbon value of at least about 70, as measured by ASTM D2416;

B. heat treating said pitch at about 35–325 degrees Centigrade for about 0.1–10 hours; and/or oxidizing at about 100–600 degrees Centigrade for about 0.1–10 hours to produce a carbon composition having a higher carbon content than said pitch;

C. prilling or spray-drying said composition;

D. thereafter solidifying as necessary and comminuting to a median average particle size of 0.5–5 microns to produce said moldable sinterable carbon composition;

E. molding said composition to produce a desired shape; and

F. sintering said shape at a temperature of about 200–600 degrees Centigrade.

20. A process according to claim 19 additionally comprising blending into said powder a carbon fiber, before said molding step.

21. An artifact according to claim 4 wherein the artifact is a component in a fuel system.

* * * * *